(12) United States Patent
Lai

(10) Patent No.: US 7,843,149 B2
(45) Date of Patent: Nov. 30, 2010

(54) LIGHT DIMMING DEVICE FOR COMPACT FLUORESCENT LAMP

(76) Inventor: Li-Chun Lai, 21F-1, No. 33, Sec. 1, Minsheng Rd., Panciao City, Taipei County (TW)

( * ) Notice: Subject to any disclaimer, the term of this patent is extended or adjusted under 35 U.S.C. 154(b) by 434 days.

(21) Appl. No.: 12/100,472

(22) Filed: Apr. 10, 2008

(65) Prior Publication Data
US 2009/0256486 A1    Oct. 15, 2009

(51) Int. Cl.
H05B 37/00    (2006.01)
(52) U.S. Cl. .................. 315/291; 315/307; 315/308; 315/DIG. 4
(58) Field of Classification Search ........... 315/317, 315/318, 291, 224, 225, 223, 240, 241 R, 315/237, 238, DIG. 4, DIG. 5, DIG. 7
See application file for complete search history.

(56) References Cited
U.S. PATENT DOCUMENTS
7,019,468 B2 *   3/2006   Deurloo et al. ............. 315/291
7,449,844 B2 *  11/2008   Lev et al. ................... 315/291

* cited by examiner

Primary Examiner—David Hung Vu
(74) Attorney, Agent, or Firm—Chun-Ming Shih

(57) ABSTRACT

A light dimming device for compact fluorescent lamp includes a rectifying circuit for rectifying an AC current signal into a zero crossing voltage signal and outputting it to a current limiting circuit; the current limiting circuit for limiting the zero crossing voltage signal and sending the current limited zero crossing voltage signal to a voltage regulating and filtering circuit and a first comparator; the voltage regulating and filtering circuit for regulating the current limited signal and sending the regulated current limited signal to a reference voltage generating circuit and a current controller; a reference voltage generating circuit for generating a reference voltage signal upon receiving the regulated current limited signal and sending the reference voltage signal respectively to the first comparator and a second comparator; a current controller for controlling the amount of a charging current of a capacitor; the first comparator for outputting a low voltage level signal to the capacitor after receiving the zero crossing voltage signal and the reference voltage signal to discharge the capacitor; the second comparator for outputting a drive signal to the drive circuit after receiving the discharging signal to turn on a power switch; the filter circuit for converting the discharging signal of the capacitor into a steady DC current signal and transferring the DC current signal to the compact fluorescent lamp so as to let the compact fluorescent lamp generate light of different luminance according to the amount of the DC current signal.

9 Claims, 2 Drawing Sheets

LIGHT DIMMING DEVICE FOR COMPACT FLUORESCENT LAMP

BACKGROUND OF THE INVENTION

1. Field of the Invention

The present invention relates to a light dimming device for compact fluorescent lamp, and more particularly, to a light dimming device for compact fluorescent lamp which can adjust the luminance of compact fluorescent lamps to save energy.

2. Description of the Prior Art

Traditional light dimmer uses a current controller to control the amount of current based on rated supply voltage and current. However, the traditional light dimmer tends to have rated voltage and current overload under an overload condition, which leads operating current going out of control and temperature rising and eventually burning down the dimmer or even causing fire.

Therefore, the traditional light dimmer presents several shortcomings to be overcome.

In view of the above-described deficiencies of the traditional light dimmer, after years of constant effort in research, the inventor of this invention has consequently developed and proposed a light dimming device for compact fluorescent lamp in the present invention.

SUMMARY OF THE INVENTION

It is an object of the present invention to provide a light dimming device for compact fluorescent lamp, which controls the amount of output current to control the luminance of the compact fluorescent lamp to save energy.

It is another object of the present invention to provide a light dimming device for compact fluorescent lamp, which is easy to operate, energy saving and highly applicable.

The present invention discloses a light dimming device for compact fluorescent lamp, which comprises a thermal fuse, a rectifying circuit, a first isolating circuit, a filter circuit, a current limiting circuit, a first comparator, a second isolating circuit, a voltage regulating and filtering circuit, a current controller, a reference voltage generating circuit, a capacitor, a second comparator, a drive circuit and a power switch. The thermal fuse cuts off the main AC power source when the light dimming device does not operate normally. The rectifying circuit rectifies the input AC current signal into a zero crossing voltage signal and transfer the zero crossing voltage signal to the current limiting circuit, which maintains the zero crossing voltage signal within a safety range and sends the current limited zero crossing voltage signal to the first comparator and the voltage regulating and filtering circuit. The voltage regulating and filtering circuit regulates the voltage signal and sends the regulated voltage signal to the reference voltage generating circuit and the current controller, wherein the current controller controls the amount of current fed to the capacitor. The reference voltage generating circuit generates a reference voltage signal after receiving the regulated voltage signal from the voltage regulating and filtering circuit and sends the reference voltage signal to the first comparator and the second comparator for comparing, and the first comparator outputs a low voltage level signal to the capacitor to discharge the capacitor after receiving the zero crossing voltage signal and the reference voltage signal, thereby letting the capacitor to output a discharging signal to the second comparator. The second comparator outputs a drive signal to the drive circuit to turn on a power switch after receiving the discharging signal from the capacitor and the reference voltage signal, thereby transferring the discharging signal of the capacitor to a filter circuit. The filter circuit converts the discharging signal of the capacitor into a steady DC current signal and transferring the DC current signal to the compact fluorescent lamp so as to let the compact fluorescent lamp generate light of different luminance according to the amount of the DC current signal.

Besides, the first isolating circuit is disposed between the rectifying circuit and the filter circuit and the second isolating circuit is disposed between the current limiting circuit and the voltage regulating and filtering circuit to respectively keep the filter circuit and the voltage regulating and filtering circuit from interfering the zero crossing voltage signal.

These features and advantages of the present invention will be fully understood and appreciated from the following detailed description of the accompanying Drawings.

DETAILED DESCRIPTION OF THE PREFERRED EMBODIMENT

Figure 1:
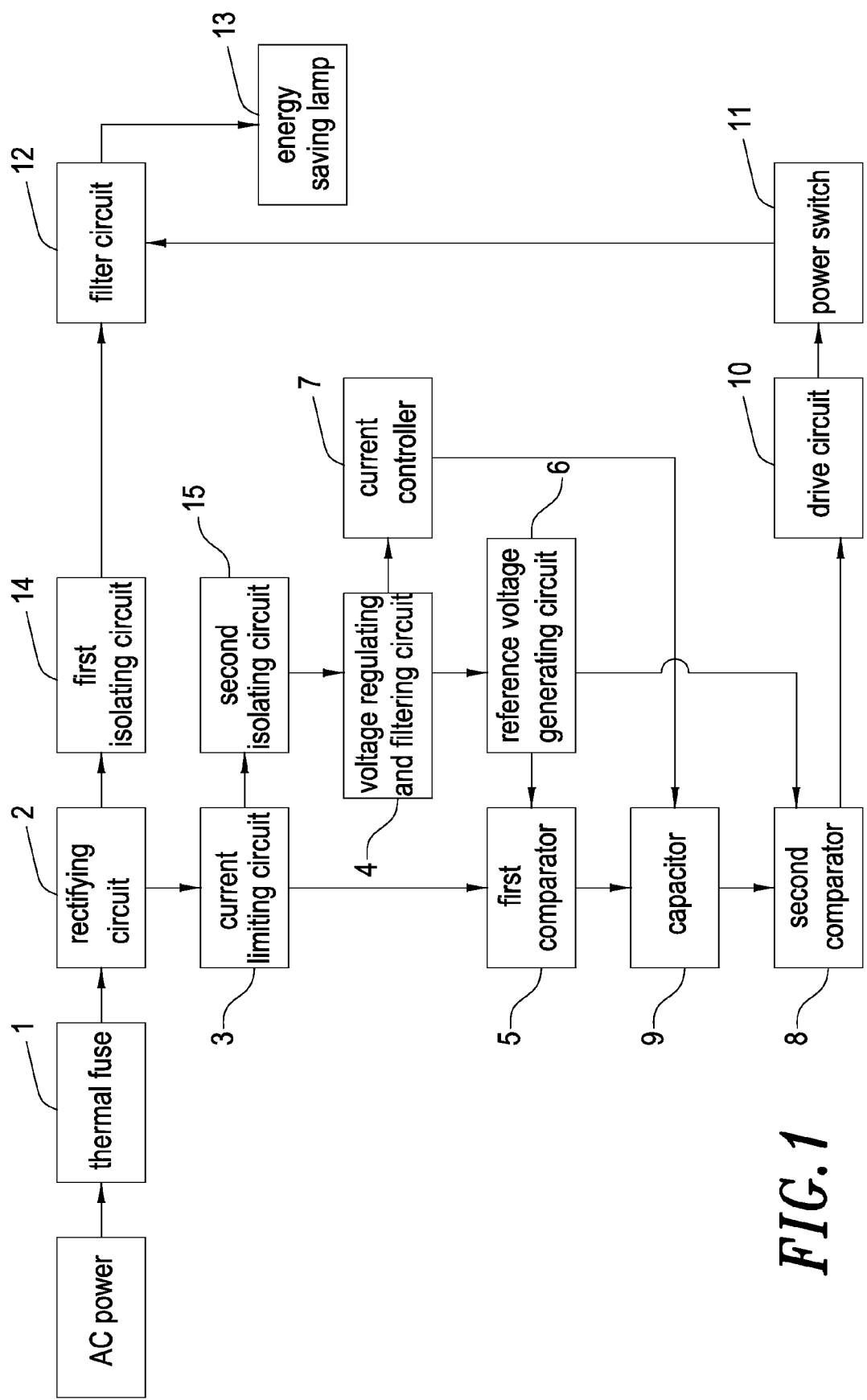
FIG. 1 illustrates a block diagram of a light dimming device for compact fluorescent lamp in the present invention.
Figure 2:
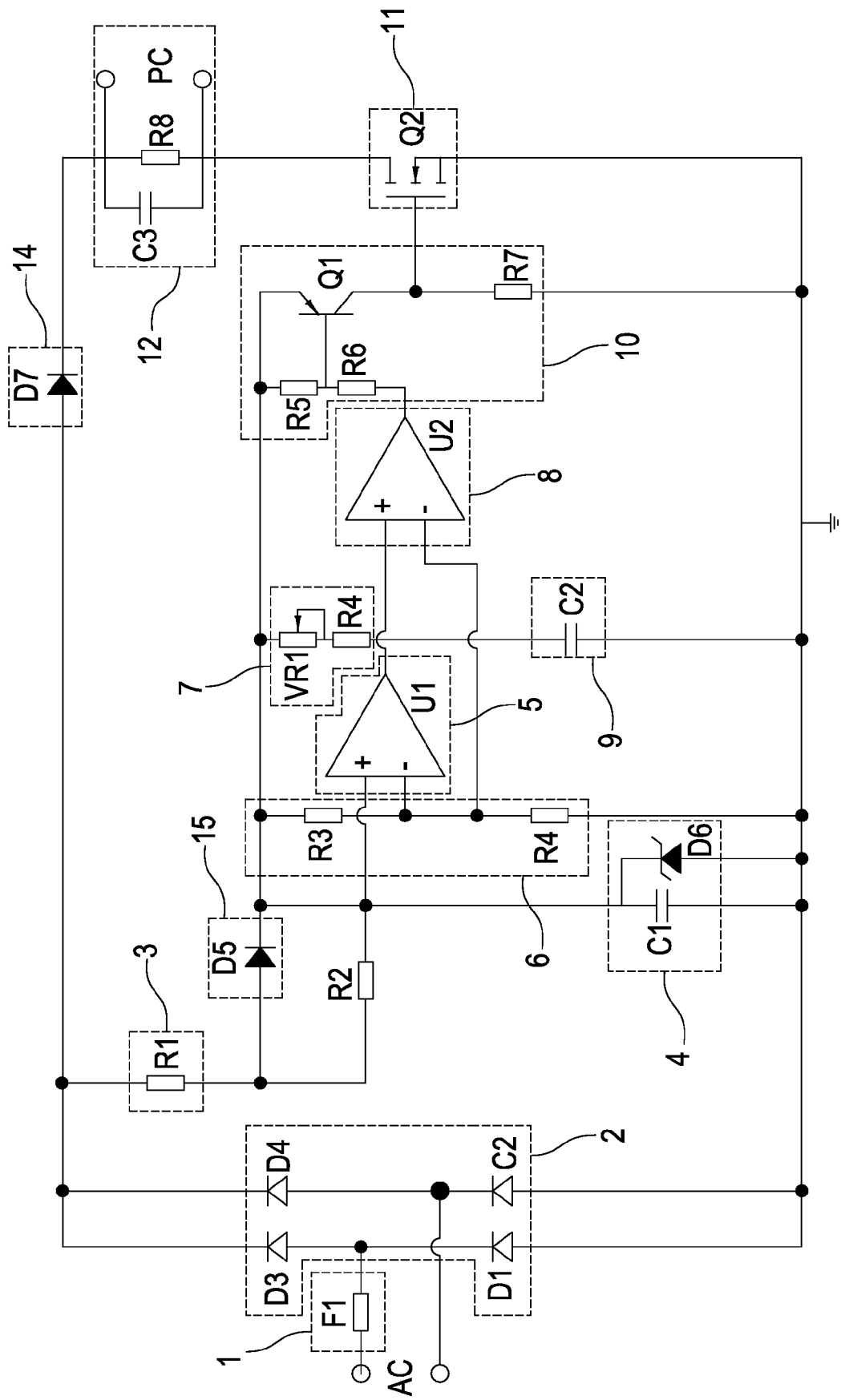
FIG. 2 illustrates a circuit diagram of the light dimming device for compact fluorescent lamp in the present invention.

Please refer to FIG. 1 and FIG. 2 for a light dimming device for compact fluorescent lamp disclosed in the present invention, which comprises:

a thermal fuse 1 connected to an AC current source for cutting off connection to the AC current source when the light dimming device does not operate normally;

a rectifying circuit 2 for rectifying an AC current signal into a zero crossing voltage signal and outputting the zero crossing voltage signal to a current limiting circuit 3;

the current limiting circuit 3 for limiting a current level of the zero crossing voltage signal within a safety range to obtain a current limited zero crossing voltage signal and sending the current limited zero crossing voltage signal to a voltage regulating and filtering circuit 4 and a first comparator 5;

the voltage regulating and filtering circuit 4 for regulating the current limited signal and sending the regulated current limited signal to a reference voltage generating circuit 6 and a current controller 7;

the reference voltage generating circuit 6 for generating a reference voltage signal upon receiving the regulated current limited signal from the voltage regulating and filtering circuit 4 and sending the reference voltage signal respectively to the first comparator and a second comparator, wherein the reference voltage is obtained from the voltage division of the voltage regulating and filtering circuit 4;

the current controller 7 for controlling the amount of a charging current of a capacitor 9, wherein the current controller 7 controls the charging current to be within the safety range of 20% to 100% of a rated current;

the first comparator 5 for outputting a low voltage level signal to the capacitor 9 after receiving the zero crossing voltage signal and the reference voltage signal;

the capacitor 9 being charged by an amount of a charging current controlled by the current controller 7; the capacitor 9 discharging and outputting a discharging signal to the second comparator 8 when the capacitor 9 receives the low voltage level signal from the first comparator 5, wherein the discharging signal comprises a saw-tooth waveform;

the second comparator 8 for converting the saw-tooth waveform of the discharging signal into a square waveform of a drive signal and outputting the drive signal to the drive circuit 10 after receiving the discharging signal from the capacitor 9 and the reference voltage signal;

the drive circuit 10 turning on a power switch 11 to transfer the discharging signal to filter circuit 12 when the drive circuit 10 receives the drive signal from the second comparator 8, wherein the power switch 11 comprises a MOSFET and the thermal fuse 1 is disposed besides the power switch 11 to protect the light dimming device under a overload condition and to detect the temperature of the power switch 11, when the temperature of the power switch 11 is too high, the thermal fuse 1 cuts off the connection to the AC current source to protect the light dimming device;

the filter circuit 12 for converting the discharging signal of the capacitor 9 into a steady DC current signal and transferring the DC current signal to the compact fluorescent lamp 13 so as to let the compact fluorescent lamp 13 generate light of different luminance according to the amount of the DC current signal, since the discharging signal of the capacitor 9 is controlled by the current controller 7, therefore the user can adjust the current level of the discharging signal of the capacitor 9 through the current controller 7 so as to control the luminance of the compact fluorescent lamp 13;

a first isolating circuit 14 disposed between the rectifying circuit 2 and the filter circuit 12 to keep the filter circuit 12 from interfering the zero crossing voltage signal;

a second isolating circuit 15 disposed between the current limiting circuit 3 and the voltage regulating and filtering circuit 4 to keep the voltage regulating and filtering circuit 4 from interfering the zero crossing voltage signal.

The present invention provides a light dimming device for compact fluorescent lamp, while compared to other traditional light dimmers, is advantageous in:

1. The present invention controls the current level of the DC current signal to control the luminance of the compact fluorescent lamp to save energy.

2. The present invention uses the current controller to control the charging current to be within the safety range of 20% to 100% of a rated current.

3. The present invention disposes the thermal fuse besides the power switch to detect the temperature of the power switch so as to prevent the possibility of the operating current going out of control and temperature rising to eventually burn down the light dimming device or even cause fire.

4. The present invention discloses a light dimming device for compact fluorescent lamp, which limits the minimum value of the operating current to be over a threshold to let the compact fluorescent lamp operate normally.

5. The present discloses a light dimming device for compact fluorescent lamp, which is easy to operate, energy saving and highly applicable.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A light dimming device for compact fluorescent lamp, comprising:

a rectifying circuit for rectifying an AC current signal into a zero crossing voltage signal and outputting the zero crossing voltage signal to a current limiting circuit;

a current limiting circuit for limiting a current level of the zero crossing voltage signal to obtain a current limited zero crossing voltage signal and sending the current limited zero crossing voltage signal to a voltage regulating and filtering circuit and a first comparator;

the voltage regulating and filtering circuit for regulating the current limited zero crossing voltage signal and sending the regulated current limited signal to a reference voltage generating circuit and a current controller;

the reference voltage generating circuit for generating a reference voltage signal upon receiving the regulated current limited signal and sending the reference voltage signal respectively to the first comparator and a second comparator;

the current controller for controlling the amount of a charging current of a capacitor;

the first comparator for outputting a low voltage level signal to the capacitor to discharge the capacitor after receiving the zero crossing voltage signal and the reference voltage signal, thereby letting the capacitor to output a discharging signal to the second comparator;

the second comparator for outputting a drive signal to the drive circuit to turn on a power switch after receiving the discharging signal and the reference voltage signal, thereby transferring the discharging signal of the capacitor to a filter circuit;

the filter circuit for converting the discharging signal of the capacitor into a steady DC current signal and transferring the DC current signal to the compact fluorescent lamp so as to let the compact fluorescent lamp generate light of different luminance according to the amount of the DC current signal.

2. The light dimming device for compact fluorescent lamp of claim 1, wherein the reference voltage is obtained from the voltage division of the voltage regulating and filtering circuit.

3. The light dimming device for compact fluorescent lamp of claim 1, wherein the current controller controls the charging current to be within the safety range of 20% to 100% of a rated current.

4. The light dimming device for compact fluorescent lamp of claim 1, wherein a thermal fuse is disposed besides the power switch to detect the temperature of the thermal fuse, when the temperature of the power switch goes too high, the thermal fuse will cutoff to keep the power switch from burning down.

5. The light dimming device for compact fluorescent lamp of claim 1, wherein the discharging signal of the capacitor comprises a saw-tooth waveform which is to be converted by the second comparator into a square waveform in order to generate the drive signal to the drive circuit.

6. The light dimming device for compact fluorescent lamp of claim 1, wherein the power switch comprises a MOSFET.

7. The light dimming device for compact fluorescent lamp of claim 1 further comprises a thermal fuse connected to an AC current source for cutting off connection to the AC current source when the light dimming device does not operate normally.

8. The light dimming device for compact fluorescent lamp of claim 1 further comprises a first isolating circuit disposed between the rectifying circuit and the filter circuit to keep the filter circuit from interfering the zero crossing voltage signal.

9. The light dimming device for compact fluorescent lamp of claim 1 further comprises a second isolating circuit disposed between the current limiting circuit and the voltage regulating and filtering circuit to keep the voltage regulating and filtering circuit from interfering the zero crossing voltage signal.

* * * * *